Patented Sept. 3, 1946

2,406,757

UNITED STATES PATENT OFFICE 2,406,757

SET STABILIZED PLASTER

Harry F. Gardner, Highland Park, Ill., assignor to Certain-teed Products Corporation, New York, N. Y., a corporation of Delaware No Drawing. Application October 23, 1942, Serial No. 463,068

5 Claims. (Cl. 106—89)

This invention relates to calcined gypsum plasters particularly those intended to be used with admixture of aggregates for structural purposes. The invention particularly relates to calcined gypsum plasters with which sand and water are mixed to form mortar for application to a plaster base in the construction of walls and ceilings.

A problem which arises in the use of such plasters is that a given plaster as manufactured is shipped to and used in different localities where different sands are available having different characteristics as to their sharpness and contamination with loam and clay and other impurities which actively affect the setting time of the calcined gypsum. In general admixture of sand or aggregates with gypsum plaster tends to accelerate the time of setting relative to the time of setting for the neat plaster. Moreover, it is a well known characteristic of most gypsum plasters that in general the setting time becomes longer as the plaster stands following manufacture. In addition to variations caused by the above mentioned qualities of the plaster and of the aggregates there is experienced also variation in the setting time because of the different conditions of the mortar boxes and mechanical mixers used making mortars by mixing water with the plaster. The amount of set plaster left in the mixing box or in the mixer and the cleanliness of these containers affect materially the setting time of ordinary plaster.

It is an object of the invention to overcome these difficulties and to provide a plaster which will have a stable set with varying conditions of use.

It is also an object of the invention to provide a plaster which may be used at a longer or a shorter period of time after its manufacture with its set determined and stabilized within limits which make it suitable for the use to which it is to be applied.

It is a further object of the invention to provide a composite plaster which may be made at the manufacturing plant and in which the time of set will be fairly constant with different types and with different amounts of the aggregates which are used and regardless of the adventitious admixture of foreign materials, and a plaster the setting time of which as so determined at the manufacturing plant is maintained over a long period of time so that the plaster may be stored for a long time and used without substantial modification of its setting time.

It is a further object of the invention to secure stabilization of set in plaster to be applied as a mortar under different atmosphere and temperature conditions. This stabilization of the set against temperature change is important because it makes unnecessary changes in the amount of retarder incorporated in the plaster at the manufacturing plant in order to meet variations in the seasonal changes or to reduce the degree of change which may be required in some cases.

It has been proposed heretofore to accomplish one or more of these objects and overcome some of the difficulties above referred to by admixture with calcined gypsum of Portland cement and the usual commercial retarder. As a modification of this proposal it also has been proposed to incorporate with calcined gypsum both Portland cement and lime, especially in the form of hydrated lime, together with the usual commercial retarder. Such a composition is described in the patent to Harn, 2,212,811, Aug. 27, 1940. It has also been proposed to stabilize plasters against variations occurring for the above described reasons by admixing with the plaster reground set calcined gypsum. Such a composition is described in the patent to Gallagher No. 1,683,539, Sept. 4, 1928. The further proposal has been made in the patent to King No. 2,078,198, April 20, 1937, of incorporating finely ground raw gypsum with the calcined gypsum containing the usual commercial retarder. In this proposal the raw gypsum is ground to a fineness such that the particle size of the raw gypsum is between 10 and 25 microns. Other proposals to secure set stabilization have been made in the art which have involved the incorporation in the mix of other ingredients which are described as tending to form in situ seed crystals of hydrated calcium sulphate, $CaSO_4 \cdot 2H_2O$.

The invention proposes a simple composition for a manufactured plaster containing relatively small amounts of auxiliary ingredients in addition to the calcined gypsum stucco and usual commercial retarder in order to secure the desired set stabilization. The invention utilizes for these auxiliary set stabilizing agents an hydraulic cement of the type represented by Portland cement and natural cement, together with calcium sulphate containing two molecules of water of crystallization, $CaSO_4 \cdot 2H_2O$. Calcium sulphate dihydrate in the form of raw gypsum or land plaster is preferred, but calcined gypsum set to the dihydrate may be used. The hydraulic cements are those which possess their setting properties due entirely or largely to the formation of silicates during the process of manufacture or use, these setting properties developing when the cement is mixed with water. The properties of Portland cement are well known. Natural cement is a product obtained by finely pulverizing calcined argillaceous limestone to which not to exceed 5% of non-deleterious materials may be added subsequent to calcination. The temperature of calcination shall be no higher than necessary to drive off carbon dioxide ($CO_2$).

By land plaster is meant for the purposes of the invention, raw gypsum or gypsum as it is mined, or in a state before it is calcined, ground to suitable size. It may be mixed dry with the calcined gypsum, the hydraulic cement and the retarder in the manufacturing plant. The degree of fineness of the land plaster for most purposes for which the invention is used may be represented as follows:

| | Per cent |
|---|---|
| Through 50 mesh | 98–100 |
| Through 100 mesh | 90– 98 |
| Through 200 mesh | 68– 86 |
| Through 325 mesh approximately | 50 |

These screen tests may be taken as representative of the standard grinds in plaster plants for ordinary purposes.

In general it has been considered that the basis on which set stabilization has been effected in the past has been that an accelerator is added to the plaster to hasten the formation of the gypsum crystals. This over-acceleration of the set is then offset by incorporating the retarder to the proper degree for securing the desired set of the plaster. The incorporation of Portland cement alone with the usual commercial retarder as proposed in the Patent 2,212,811 accomplishes set stabilization to a certain degree. It should be noted, however, that a very large amount of Portland cement must be used in order to secure the results. Moreover, the Portland cement even when used in proportions indicated in the patent will not sufficiently stabilize the plaster against adventitious changes or against the effects of different sand and aggregates. The proposal of the Patent 2,078,198, requiring mixture with the plaster of land plaster, raw gypsum, ground to a particle size of 10 to 25 microns, involves costly grinding operations, necessitates careful control and is believed not to prevent marked slowing down of setting time upon aging even though there may accrue some set stabilization with various proportions of sand or aggregate in a given mix.

The invention accomplishes stabilization against all such variations and causes of variations above referred to by the simple composition of an hydraulic cement of the type of Portland cement or natural cement, land plaster and commercial retarder with a normal calcined gypsum plaster or stucco capable of setting with water. Preferably the stucco is tube milled but the invention is not limited to "tubed" stuccos. Within the scope of the invention the ingredients may be used in the proportions as follows:

*Formula A*

| | Pounds | Per cent |
|---|---|---|
| Tube milled stucco | 1991—1928 | 99.55—96.40 |
| Portland cement | 2— 40 | .10— 2.00 |
| Land plaster | 1— 20 | .05— 1.00 |
| Commercial retarder | 6— 12 | .30— .60 |
| | 2000 -2000 | 100.00—100.00 |

Natural cement may be used in place of Portland cement in this and the following formulae. Some variations may be made in the amounts of these ingredients beyond the range indicated in the above tabulation. Preferably, however, the proportions of these ingredients of the composite stucco for purpose of the invention is as follows:

| | Pounds | Per cent |
|---|---|---|
| Tube calcined gypsum stucco | 1985 —1969 | 99.37—98.50 |
| Portland cement | 4 — 12 | .20— .60 |
| Land plaster | 2 — 8 | .10— .40 |
| Commercial retarder | 6½— 10 | .33— .50 |
| | | 100.00—100.00 |

Typical of the results to be obtained by the invention a plaster utilizing Portland cement and of the composition

*Formula B*

| | |
|---|---|
| Tubed stucco calcined | 2000 |
| Portland cement | 10 |
| Land plaster uncalcined | 4 |
| Commercial retarder | 8 | was tested for stabilization and aging. Table I below shows the setting time for the fresh plaster, the setting time for plaster after five days aging in a small paper bag and the setting time after aging for 5 weeks.

*Table I*

| Item | Ratio sand to plaster | Type of sand |
|---|---|---|
| 1 | Neat | |
| 2 | 3/1 | Standard Ottawa testing sand. |
| 3 | 3/1 | Buffalo sand. |
| 4 | 2/1 | Pittsburgh sand. |
| 5 | 4/1 | Do. |
| 6 | 2/1 | Pittsburgh sand plus 0.1% fine ground fresh raw gypsum. |
| 7 | 2/1 | Bridgeport sand. |
| 8 | 3½/1 | Do. |
| 9 | 2/1 | Bridgeport sand plus 0.1% fine ground fresh raw gypsum. |

| Item | Stabilized fresh | Stabilized aged 5 days | Stabilized aged 5 weeks | Unstabilized |
|---|---|---|---|---|
| | Hours | Hours | Hours | Hours |
| 1 | 3:15 | 4:00 | 4:29 | 30:00 |
| 2 | 2:43 | 2:56 | 3:22 | 24:00 |
| 3 | 4:11 | 4:29 | 3:55 | 4:55 |
| 4 | 4:09 | 4:22 | 4:31 | 18:00 |
| 5 | 3:07 | 2:50 | 3:16 | 9:21 |
| 6 | 2:05 | 2:18 | 2:24 | 2:19 |
| 7 | 3:33 | 3:26 | 3:27 | 18:00 |
| 8 | 3:31 | 3:14 | 4:05 | 8:22 |
| 9 | 2:00 | 1.47 | 2:03 | 2:25 |

As shown in this table these tests were made with a number of different sands as well as with the neat plaster. Also, with some of the sands there was mixed an additional amount of accelerator, raw gypsum, representing a condition which may occur in the use of dirty mixing boxes and mixers contaminated with set gypsum plaster or other foreign material.

For comparison in the right-hand column is given the setting time for an ordinary unstabilized wall plaster containing commercial retarder. Although with some plasters of the prior art it may have been possible to obtain stabilized set for various types of sand and aggregates when the plaster is fresh such stabilization is not always maintained when the plaster has aged. Comparison of the first column with the second and third columns of the above table shows that the stabilization not only is obtained with a considerable variety of aggregates but that the degree of this stabilization is maintained after the plaster is aged so as to be almost the same as when it is fresh or with little slowing, and for all the different aggregates.

Not only has the set been stabilized by the present invention as above described and indicated in the table but it is found that the composition plaster of the invention is strongly stabilized against the effect of changes in temperature of the atmosphere. This makes it possible to avoid marked changes in the amount of retarder which is added to the plaster in the winter season as compared with the summer season. Moreover, it makes it possible to ship the plaster into different territories having different conditions of climate without risk of difficulties arising in the use of the plaster after a period of time and with different aggregates.

Indicative of the results which may be obtained with the above composition of the invention utilizing Portland cement under varying conditions of temperature the following table is given:

*Table II*

| Item | Ratio sand to plaster | Type of sand |
|---|---|---|
| 1 | Neat | |
| 2 | 3/1 | Standard Ottawa testing sand. |
| 3 | 3/1 | Buffalo sand. |
| 4 | 2/1 | Pittsburgh sand. |
| 5 | 4/1 | Do. |
| 6 | 2/1 | Pittsburgh sand plus 0.1% fine ground fresh raw gypsum. |
| 7 | 2/1 | Bridgeport sand. |
| 8 | 3½/1 | Do. |
| 9 | 2/1 | Bridgeport sand plus 0.1% fine ground fresh raw gypsum. |

| Item | Set at 42° F. | Set at 70° F. | Set at 90° F. |
|---|---|---|---|
| | Hours | Hours | Hours |
| 1 | 3:21 | 4:29 | 7:00 |
| 2 | 2:34 | 3:22 | 5:15 |
| 3 | 4:02 | 3:55 | 6:08 |
| 4 | 3:30 | 4:31 | 5:11 |
| 5 | 3:00 | 3:16 | 3:14 |
| 6 | 2:05 | 2:24 | 3:02 |
| 7 | 2:54 | 3:27 | 5:50 |
| 8 | 3:00 | 4:05 | 4:28 |
| 9 | 1:45 | 2:03 | 2:26 |

It will be noted that the variation in setting time as shown in Table II, while somewhat greater with some sands than the variations shown in Table I, nevertheless is quite limited for a substantial change in atmospheric temperature, namely, between 42° F. and 90° F. which may be considered to correspond to differences between winter and summer job conditions. In comparison with the setting times indicated in Table II for plaster set stabilized according to the invention, the following table shows for unstabilized plaster and for a variety of sands a wide variation in the setting time at different temperatures.

*Table III*

| Item | Ratio sand to plaster | Type of sand |
|---|---|---|
| 1 | Neat | |
| 2 | 3/1 | Standard Ottawa testing sand. |
| 3 | 3/1 | Cleveland sand. |
| 4 | 3/1 | York sand. |
| 5 | 1½/1 | Philadelphia sand. |
| 6 | 3/1 | Do. |
| 7 | 3/1 | Philadelphia sand plus 0.125% fine ground fresh land plaster. |

| Item | Not stabilized set at 50° F. | Not stabilized set at 70° F. | Not stabilized set at 100° F. |
|---|---|---|---|
| | Hours | Hours | Hours |
| 1 | 36.0 | 41.0 | 52.0 |
| 2 | 15.2 | 20.5 | 35.0 |
| 3 | 6.0 | 7.3 | 15.3 |
| 4 | 2.1 | 2.0 | 2.0 |
| 5 | 15.2 | 18.5 | 36.0 |
| 6 | 10.2 | 11.0 | 23.7 |
| 7 | 2.4 | 2.6 | 2.6 |

Similar results may be obtained with natural cement substituted for the Portland cement of Formula B. The following Table IV of setting times shows the comparison of Portland and natural cements for a different formula, Formula C, but within the range of composition of the general formula, that is, Formula A above. The setting times are those for the fresh stabilized product.

*Formula C*

| | Pounds | | Pounds |
|---|---|---|---|
| Tube mill stucco | 2,000 | Tube mill stucco | 2,000 |
| Portland cement | 30 | Natural cement | 30 |
| Land plaster | 3 | Land plaster | 3 |
| Retarder | 10 | Retarder | 10 |

*Table IV*

| Item | Ratio sand to plaster | Type of sand |
|---|---|---|
| 1 | Neat | |
| 2 | 3/1 | Standard Ottawa. |
| 3 | 3/1 | Buffalo. |
| 4 | 2/1 | Pittsburgh. |
| 5 | 4/1 | Do. |
| 6 | 2/1 | Pittsburgh plus .1% fine raw gypsum. |

| Portland cement | Natural cement |
|---|---|
| Hours | Hours |
| 7.3 | 9.55 |
| 4.58 | 6.38 |
| 5.56 | 7.51 |
| 4.24 | 5.51 |
| 2.52 | 3.32 |
| 3.20 | 3.40 |

The item numbers in Table IV correspond respectively to the like numbered items in Tables I and II. As will be seen the data is secured for the same sands. While natural cement shows somewhat slower setting time than the Portland cement for certain sands and for the neat stucco, marked stabilization is secured as compared with the unstabilized plaster indicated in the right-hand column of Table I. In general the results obtained with natural cement and with Portland cement are closely similar. These two among the hydraulic cements are preferred for the purposes of the invention.

The composition plaster of the invention utilizes these ingredients and such amounts of these ingredients as make possible a reduction in the cost of plasters of this type known as set stabilized plasters. The land plaster or raw, uncalcined gypsum utilized in the composition of the invention is a cheap, intermediate product in the process of manufacture of calcined gypsum. It is produced by grinding the broken gypsum rock at a relatively early stage of the manufacturing process. Portland cement and natural cement also are relatively cheap materials. The amounts of these ingredients as may be seen from the above tables are small percentages. In the preferred range of the materials of the composition these ingredients are of fractional percentage. The amount of retarder necessary for the composite plaster corresponds in a general way to that amount which is required for set stabilized plasters of the prior art.

It is important for the preparation of the set stabilized plaster of the invention that the stucco following its calcination shall have been allowed to cool down to a temperature not substantially in excess of 130° F. This removal of heat from the calcined gypsum coming from the kettle is necessary because the land plaster of the composition of the invention will become calcined if the stucco with which it is mixed is at too high a temperature. Calcination of the land plaster to calcined gypsum will prevent the desired accelerating action of the land plaster so that in combination with the Portland cement and the retarder the desired interaction will not take place which is effective to secure a substantially constant time of set which is significant of the stabilization of the invention.

This application is a continuation in part of my prior application Serial No. 382,016, filed March 6, 1941.

Having thus described my invention, I now claim:

1. Calcined gypsum plaster comprising as a dry mixture for gauging with water calcined gypsum capable of setting with water and in predominant amount, Portland cement, raw gypsum and commercial retarder, the amount of the Portland cement being not substantially less than the amount of the raw gypsum.

2. Calcined gypsum plaster comprising as a dry mixture for gauging with water calcined gypsum capable of setting with water and in predominant amount, Portland cement in amount between .1% and 2%, land plaster in amount between .05% to 1% and retarder in amount between .3% and .6%.

3. Calcined gypsum plaster comprising as a dry mixture for gauging with water calcined gypsum capable of setting with water and in predominant amount, Portland cement in amount between .2% and .6%, land plaster in amount between .1% to .4% and retarder in amount between .33% to .50%.

4. Calcined gypsum plaster comprising as a dry mixture for gauging with water calcined gypsum capable of setting with water and in predominant amount, Portland cement, land plaster with a fineness to pass 90% to 98% through 100 mesh, and a commercial retarder, the amount of the Portland cement being not substantially less than that of the land plaster, the sum of the amounts of the Portland cement, land plaster and commercial retarder being not substantially greater than 3.6%.

5. Calcined gypsum plaster comprising as a dry mixture for gauging with water calcined gypsum capable of setting with water and in predominant amount, an hydraulic cement selected from the group consisting of Portland cement and natural cement, land plaster, and commercial retarder.

HARRY F. GARDNER.

Certificate of Correction

Patent No. 2,406,757.　　　　　　　　　　　　　　September 3, 194o.

HARRY F. GARDNER

It is hereby certified that errors appear in the above numbered patent requiring correction as follows: In the grant, line 3, and in the heading to the specification, line 5, state of incorporation, for "Delaware" read *Maryland*; as shown by the record of assignments in this Office; and that the said Letters Patent should be read with these corrections therein that the same may conform to the record of the case in the Patent Office.

Signed and sealed this 12th day of November, A. D. 1946.

[SEAL]

LESLIE FRAZER,
*First Assistant Commissioner of Patents.*